Figure 6:
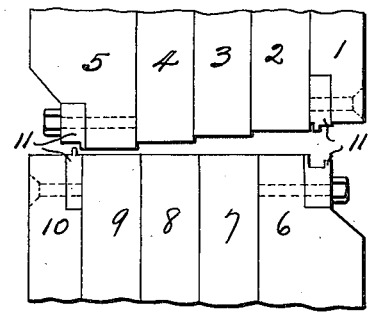

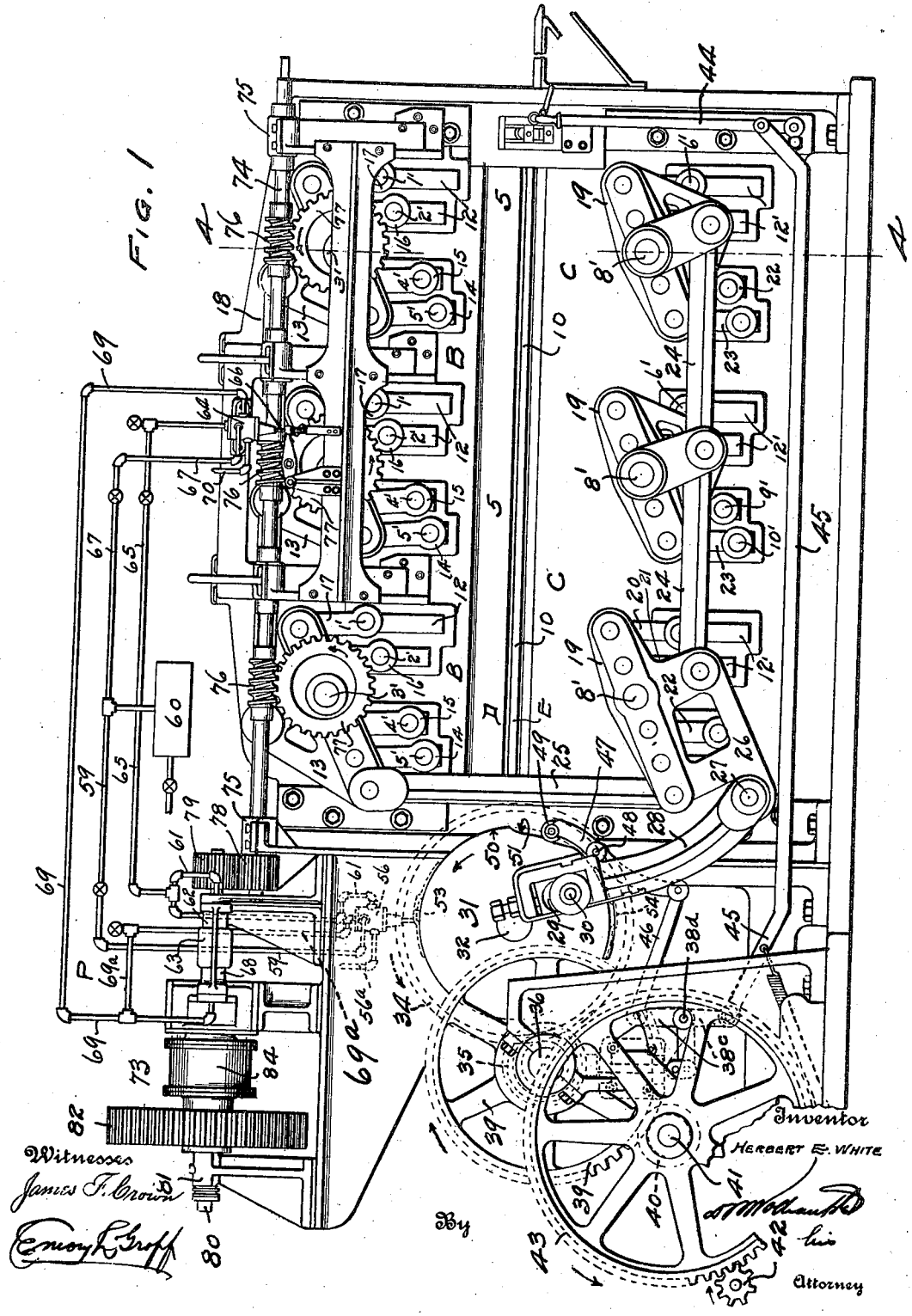

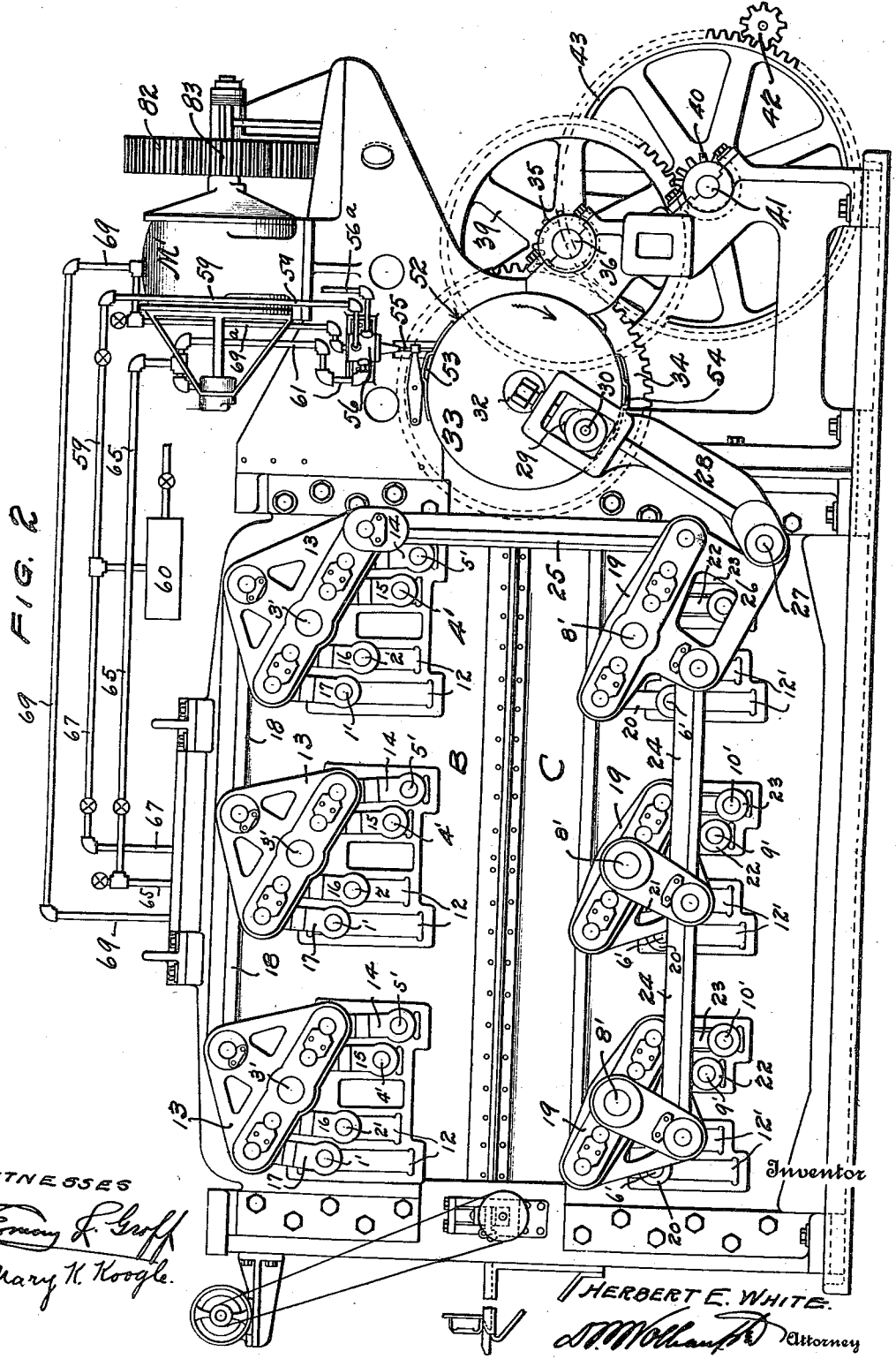

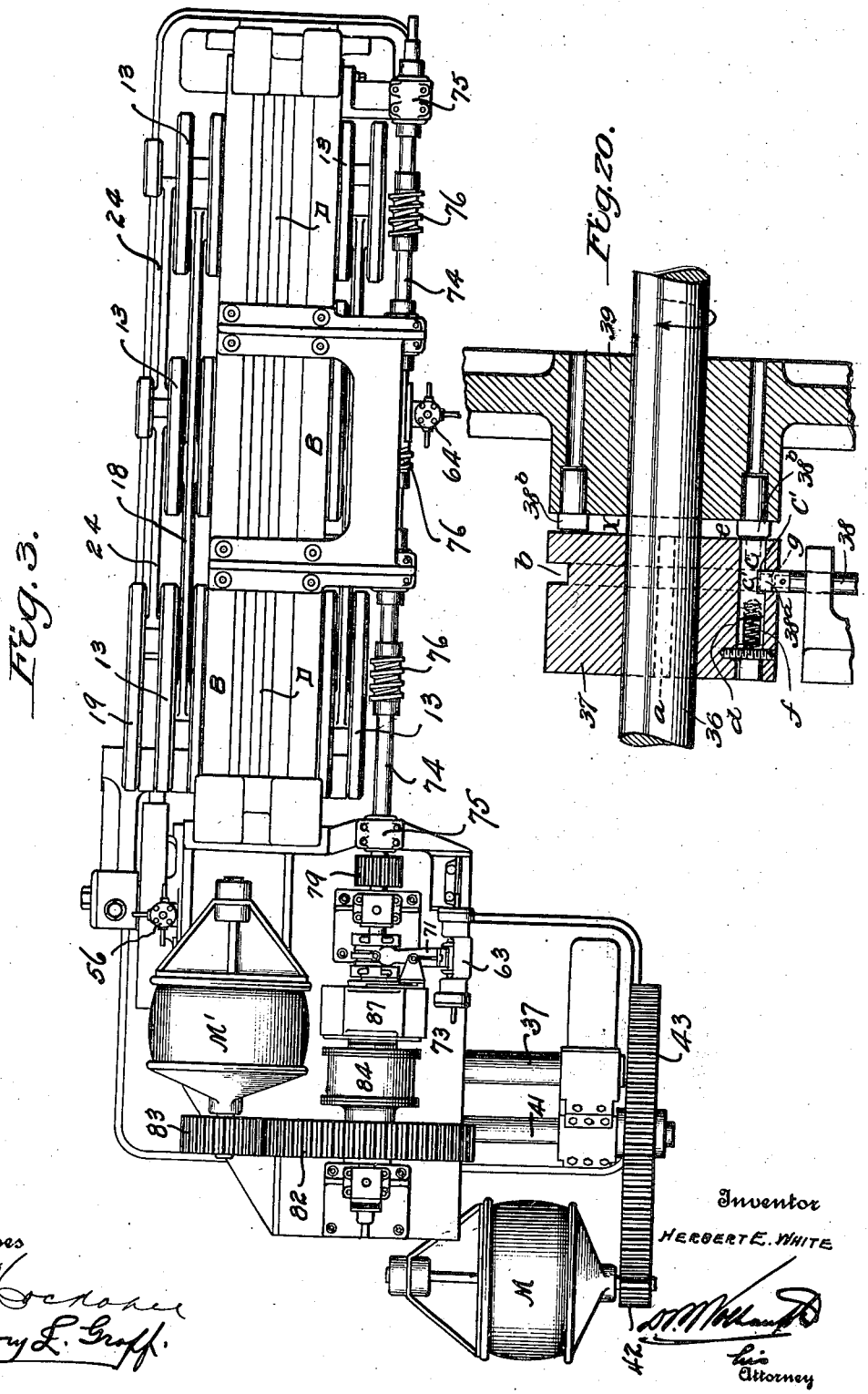

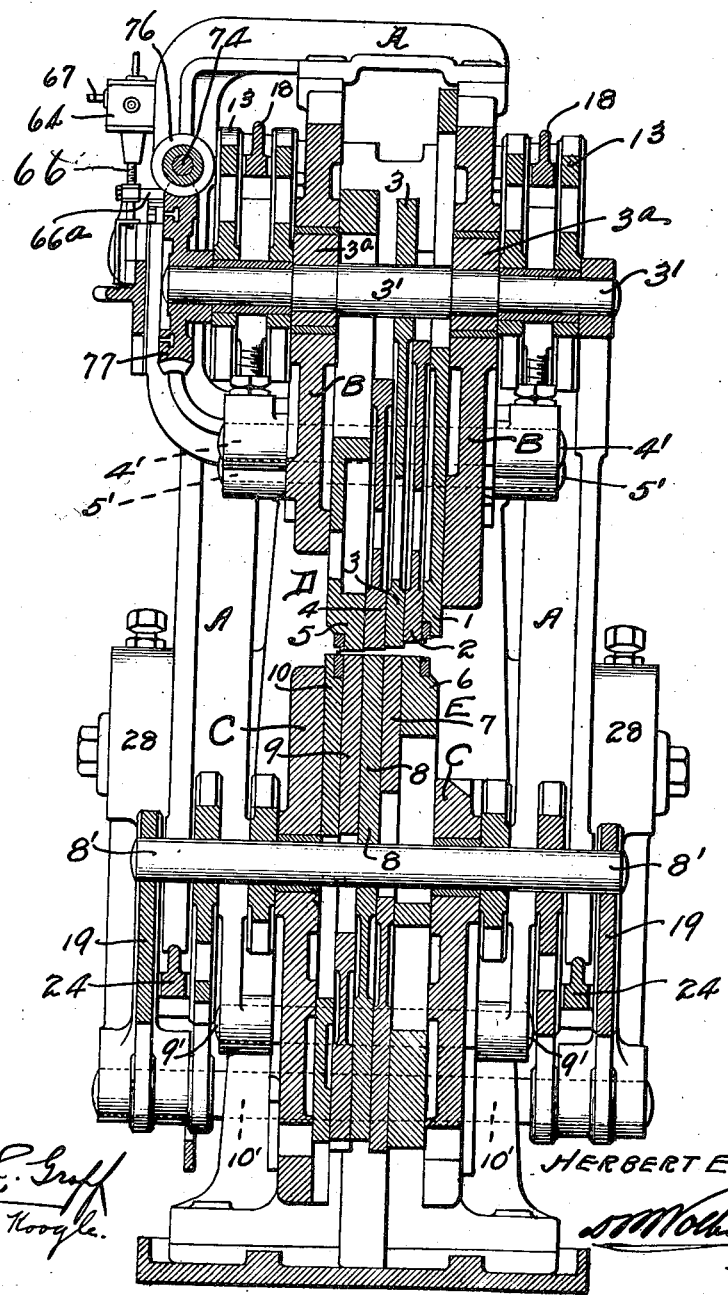

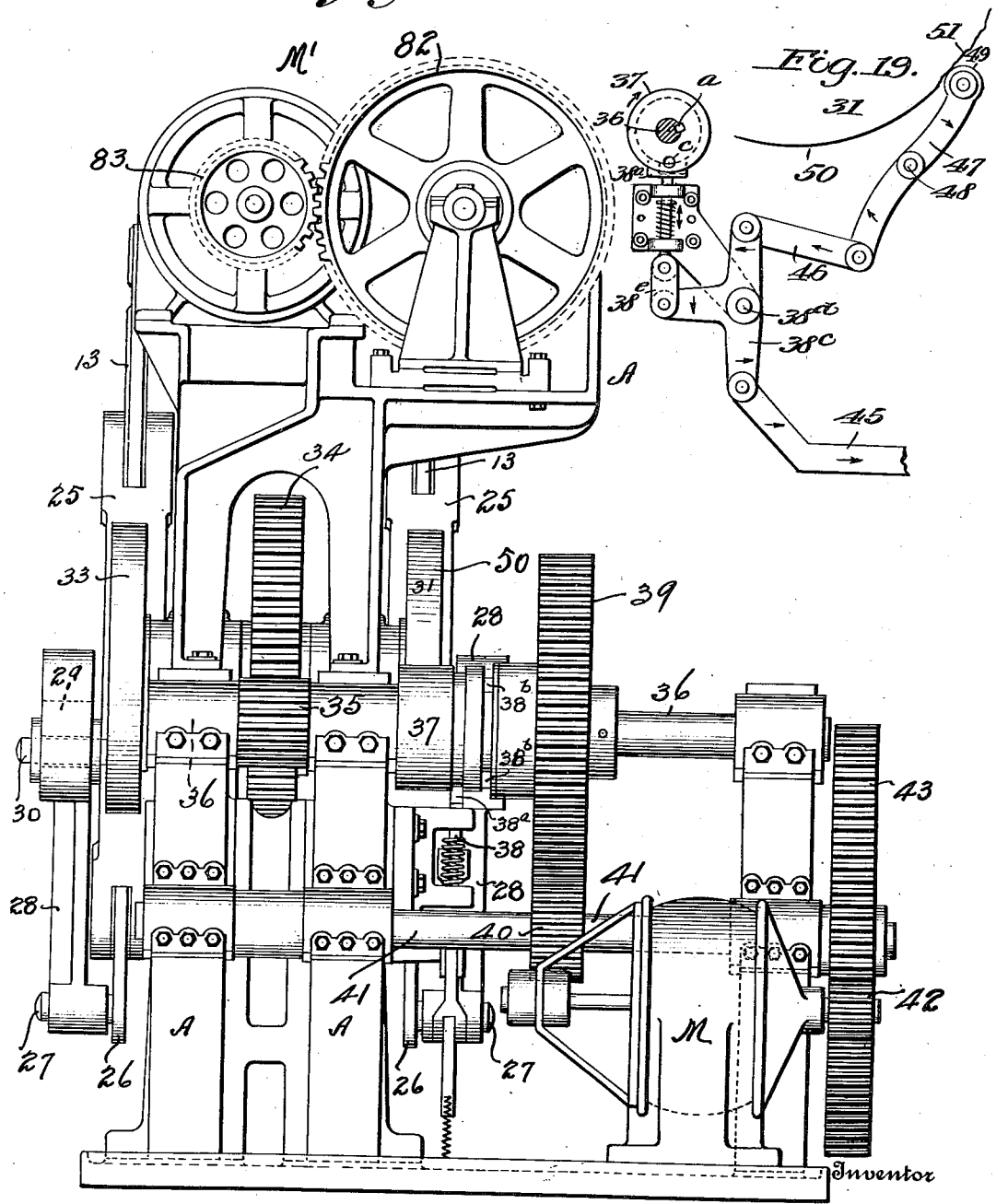

H. E. WHITE.
MACHINE CONTROLLING MECHANISM.
APPLICATION FILED JUNE 11, 1915.

1,167,865.

Patented Jan. 11, 1916.
10 SHEETS—SHEET 6.

Witnesses
James F. Crown
Emory L. Groff

Inventor
HERBERT E. WHITE
By
his Attorney

H. E. WHITE.
MACHINE CONTROLLING MECHANISM.
APPLICATION FILED JUNE 11, 1915.

1,167,865.

Patented Jan. 11, 1916.
10 SHEETS—SHEET 7.

Witnesses
James F. Crown

Inventor
Herbert E. White
his Attorney

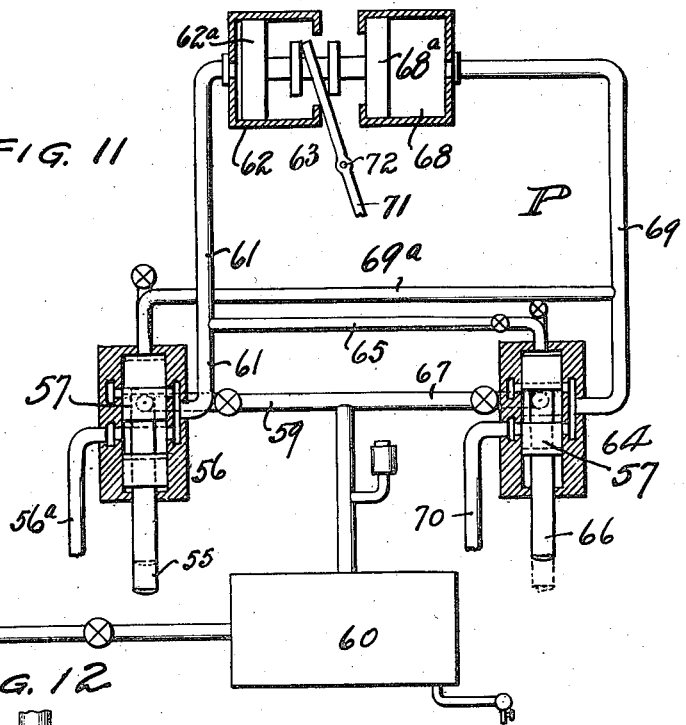
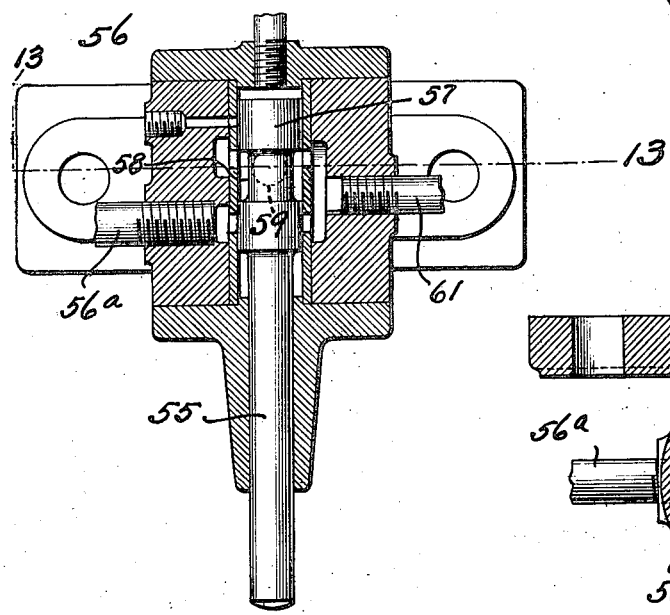
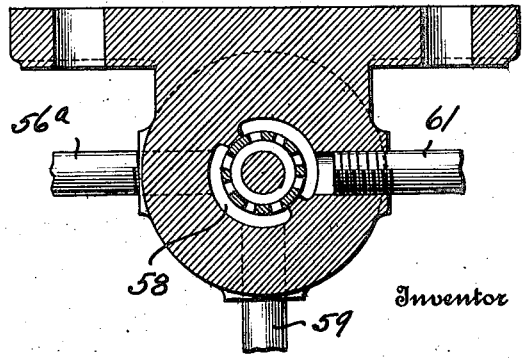

H. E. WHITE.
MACHINE CONTROLLING MECHANISM.
APPLICATION FILED JUNE 11, 1915.

1,167,865.

Patented Jan. 11, 1916.
10 SHEETS—SHEET 9.

Witnesses

Inventor
HERBERT E. WHITE
By
his Attorney

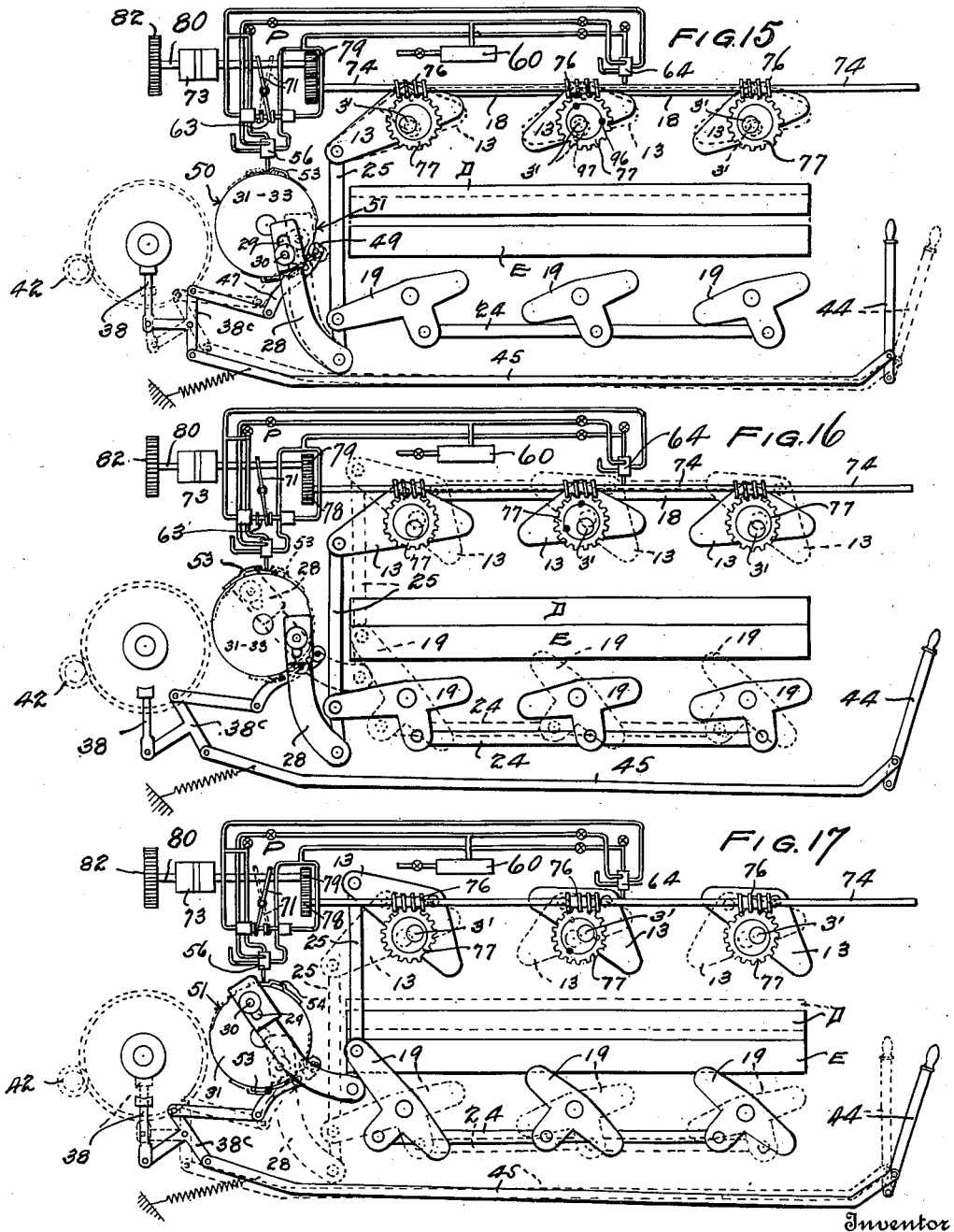

UNITED STATES PATENT OFFICE.

HERBERT E. WHITE, OF YOUNGSTOWN, OHIO.

MACHINE-CONTROLLING MECHANISM.

1,167,865.　　　　　　Specification of Letters Patent.　　Patented Jan. 11, 1916.

Application filed June 11, 1915.　Serial No. 33,536.

*To all whom it may concern:*

Be it known that I, HERBERT E. WHITE, a citizen of the United States, residing at Youngstown, in the county of Mahoning and State of Ohio, have invented certain new and useful Improvements in Machine-Controlling Mechanism, of which the following is a specification.

This invention relates to a novel and practical machine controlling mechanism intended to provide positive and reliable means for effecting an instantaneous control of power machines having members which must be quickly thrown into operative position and quickly thrown out of operative position without idle or lost motion and without shock or jar to the machinery. To this end, the improved machine controlling mechanism is capable of general application to machines having these requirements, but possesses special utility in its application as an automatic controlling device to a metal expanding machine to render such machines quickly responsive in the operations of clamping and releasing the sheet so that the process of expansion may be carried out economically and very rapidly.

A principal object of the invention is to provide an automatic machine controlling mechanism of the fluid-pressure type (preferably pneumatic) in order to permit the utilization of a pneumatically controlled clutch and brake unit to automatically effect a quick lowering and raising of the upper set of expanding jaws without shock or jar and without lost or idle motion.

A further object of the invention in connection with the application of the pneumatically controlled clutch and brake unit to a metal expanding machine is to provide positive and effective means for accurately timing the several operations of initially clamping the slitted metal sheet in position within the confines of the machine, then for the said mechanism to remain momentarily in a state of rest while the expanding instrumentalities perform their function, and then the controlling mechanism quickly resuming its activity to restore the machine parts preparatory to repeating their operations.

With these and other objects in view which will be apparent to those familiar with this art, the invention consists in the novel construction, combination, and arrangement of parts hereinafter more fully described, illustrated and claimed.

The essential features of the invention involved in the pneumatically controlled clutch and brake unit, and the novel combinations in which it is employed in a metal expanding machine, are susceptible to a wide range of structural modification without departing from the spirit or scope of the invention. However, for purposes of illustration, the improvements are shown incorporated in and with a metal expanding machine of the type designed for manufacturing the well known herringbone form of expanded sheet metal. This illustration appears in the accompanying drawings, in which:—

Figure 7:
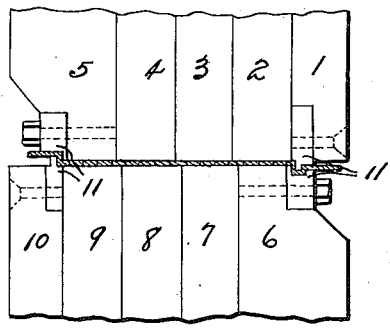
Figure 8:
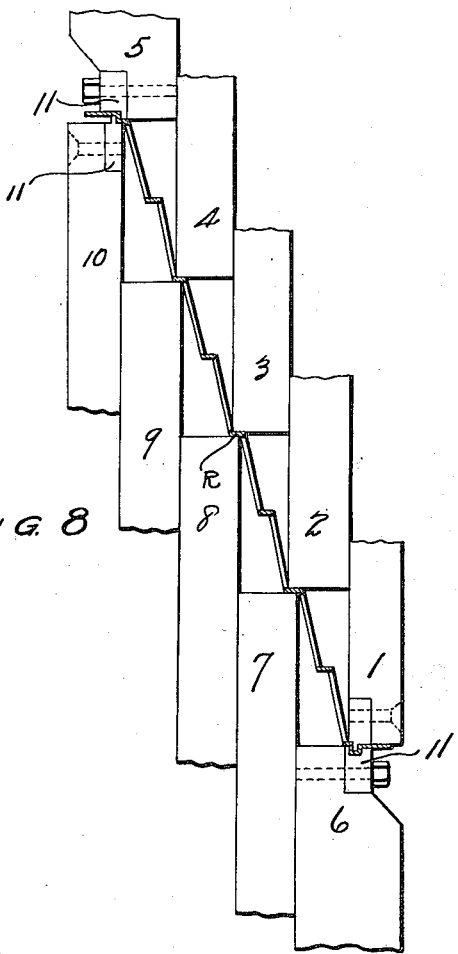
Figure 9:
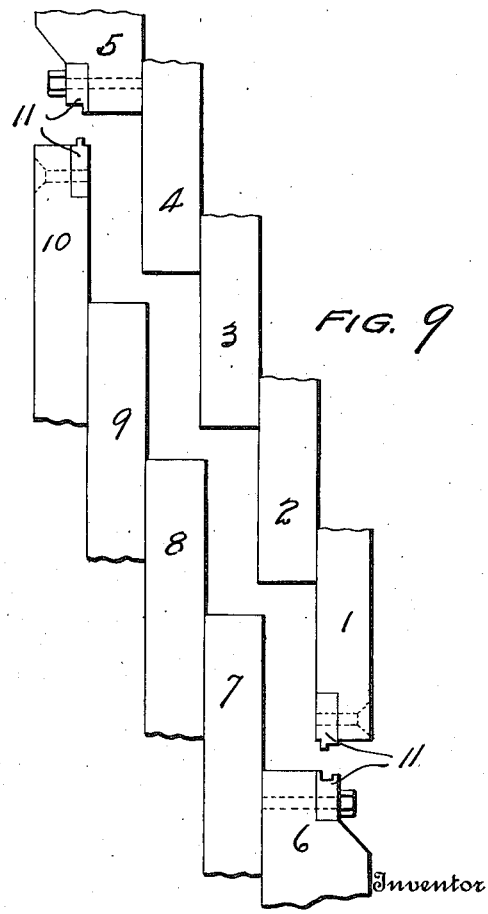
Figure 10:
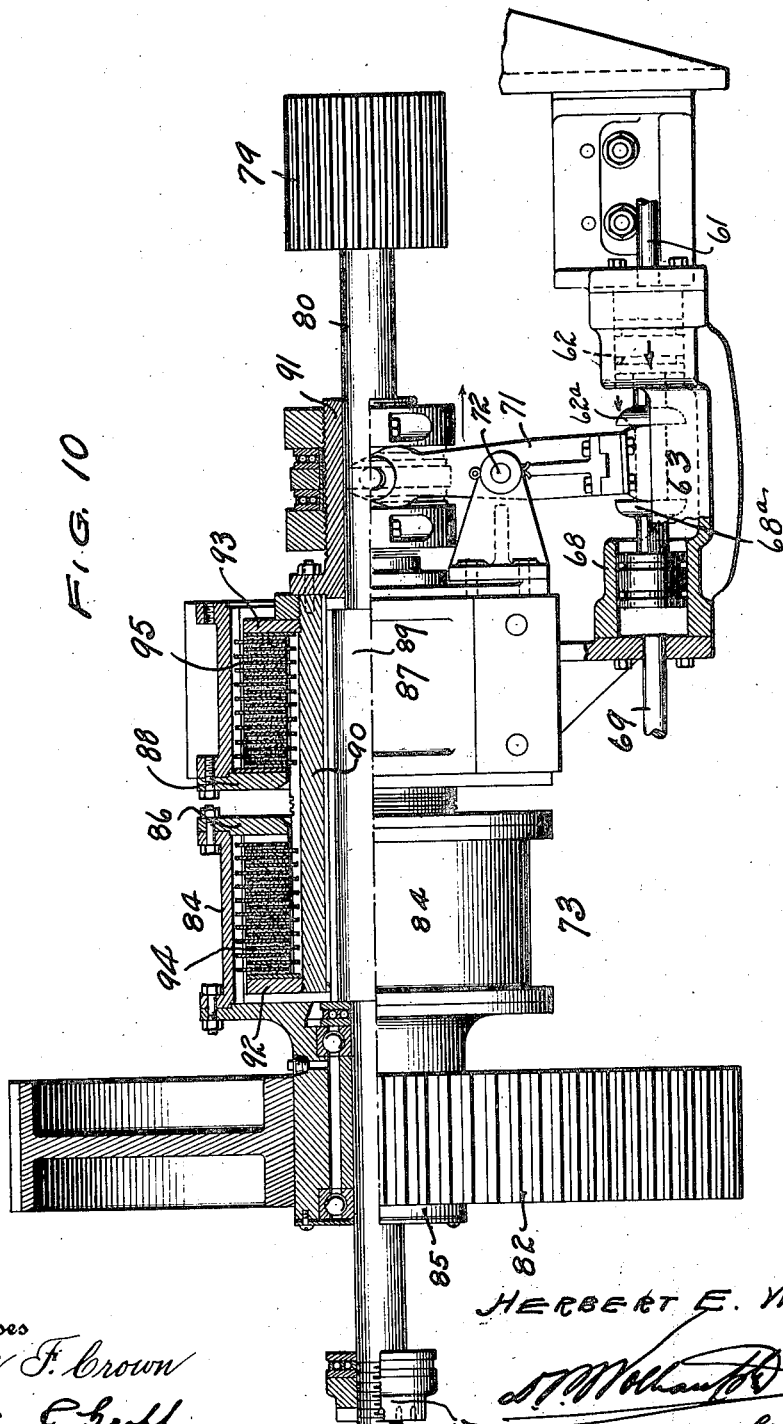
Figure 1A:
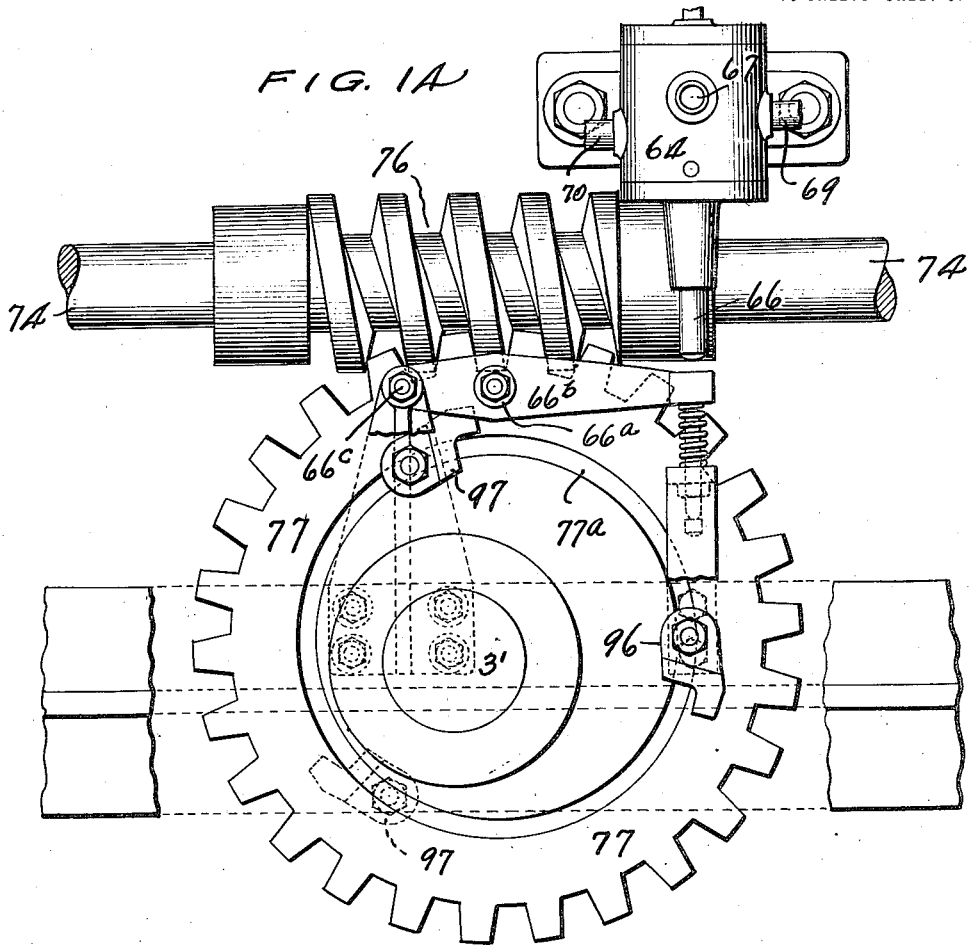
Figure 18:
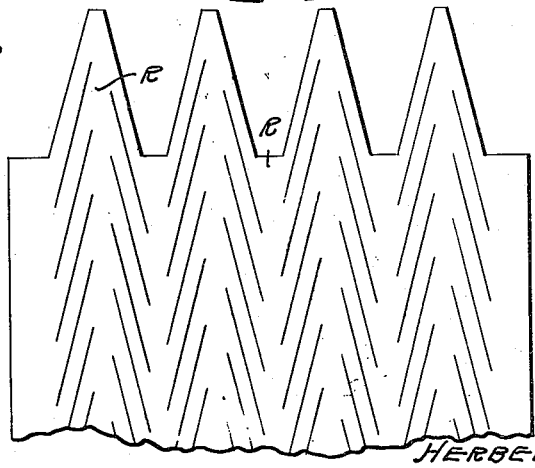

Figure 1 is a side elevation of a metal expanding machine equipped with the improvements contemplated by the present invention, and showing the operating parts of the expanding machine proper in initial positions. Fig. 2 is a view similar to Fig. 1 from the opposite side of the machine, with the parts of the expanding mechanism proper in initial positions. Fig. 3 is a top plan view of the machine. Fig. 4 is a vertical cross sectional view of the machine, the general line of section being indicated by the line 4—4 of Fig. 1. Fig. 5 is a rear end view of the machine. Fig. 6 is a detail view of the opposing portions of the individual jaws of the upper and lower expanding sets, shown in their initial separated positions to permit of the placing of the slitted metal sheet therebetween. Fig. 7 is a similar view of the same parts with the two jaw sets closed with the slitted metal sheet clamped between them. Fig. 8 is a view illustrating the various jaw members moved into the relative positions which they occupy when expanding the sheet to its fullest extent, the view illustrating the expanded sheet between and engaged by the jaw members. Fig. 9 is a view similar to Fig. 8, but illustrating the jaw members of the upper and lower sets separated, and the metal sheet omitted. Fig. 10 is an elevation partly in section of the pneumatically controlled combined clutch and brake unit constituting the primary device of the controlling mechanism of which it forms a part. Fig. 11 is a diagrammatic view, partly in elevation and partly in section, of the piping arrangement associated with the starting and stopping valves and with the piston and cylinder device of the clutch and brake unit. Fig. 12 is a sectional view illustrating one form of valve that may be employed as both the starting and stopping valve of the mechanism. Fig. 13 is a cross sectional view on the line 13—13 of Fig. 12. Fig. 14 is an enlarged detail elevation showing the worm gear unit for the upper jaw set which is utilized as a controlling device for the stopping valve of the pneumatic system. Figs. 15, 16 and 17 are similar diagrammatic views showing the general operative relation and coöperation between the pneumatically actuated controlling mechanism and the expanding mechanism proper of an expanding machine, the said views respectively showing the positions assumed by the various parts, first with the jaws in their initial separated positions; second, with the jaws closed to clamp the sheet; and, third, during the expanding operation and the return to normal position (the latter condition being indicated by the dotted lines in Fig. 17). Fig. 18 is a detail plan view of a form of slitted blank that may be employed in producing the herringbone lath by means of the expanding machine illustrated. Fig. 19 is a detail elevation of the main clutch device and its operating connections, and Fig. 20 is a detail vertical sectional view of the main clutch device.

Similar reference characters designate corresponding parts throughout the several figures of the drawings.

As indicated, the pneumatically controlled clutch and brake unit and the essential instrumentalities coöperating therewith are susceptible of application to different uses, but inasmuch as their embodiment in a metal expanding machine represents an important and practical application of the invention, the illustration and description thereof is confined herein to a machine for expanding slitted sheet metal, and particularly to a machine of this type possessing means for rapidly producing the herringbone type of expanded lath. Accordingly, a description of the novel pneumatically controlled clutch and brake unit will hereinafter fully appear in its appropriate place in its relation to the operating parts of a machine of that character.

Now, referring to the illustrated type of machine with which the improvements are associated, it will be observed from the drawings that the said machine in its general organization includes a framework A having the upper stationary side frame members B and the lower stationary side frame members C. Arranged in side by side relation between the upper frame members B is an upper set of expanding jaws comprising an upper expanding unit designated in its entirety as D, while directly beneath these jaws is a complemental lower set of expanding jaws E comprising a lower expanding unit which coöperates with the upper unit to progressively expand a slitted metal sheet clamped therebetween.

The upper expanding unit D includes a plurality of individual jaw members designated as 1, 2, 3, 4, and 5 respectively, and the lower unit E includes coöperating jaw members respectively numbered 6, 7, 8, 9, and 10. By reference to Fig. 4 and Figs. 6, 7, 8, and 9, it will be apparent that the jaws 1—6, 2—7, 3—8, 4—9 and 5—10 coöperate to grip the unslitted portion of the metal sheet, and in this connection it will also be noted that the outer jaw members 1 and 6, and 5 and 10 respectively of the upper and lower expanding units are provided with interlocking longitudinally arranged sheet gripping elements 11, which are adapted to positively grip and hold the lateral edges of the metal sheet during the expanding. At this point, it may be noted that the central jaw 3 of the upper expanding unit D, and the corresponding central jaw 8 of the lower expanding unit E, do not move during expansion of the metal sheet, having the functional characteristic of an intermediate clamp to hold the uncut central portion of the sheet whereby the slitted portions at both sides of the central line of the sheet may be simultaneously expanded or opened into meshes.

The individual jaws of the upper expanding unit D are hung upon a plurality of shafts which pass transversely through the machine, the ends of these shafts being shown in Figs. 1 and 2 indicated at 5', 4', 3', 2' and 1' and preferably arranged in groups. Thus, it will be apparent that the jaw 5 is carried and actuated by the several shafts 5', the jaw 4 by the shafts 4', etc., respectively.

As has been previously stated, the jaw 3 does not move during the expanding operation, but merely moves in initially clamping the metal sheet and in returning to normal position. This movement is made possible by mounting the said shaft 3' eccentrically in the bearings 3ª in the side frames B—B, which bearings are capable of rotating about their true centers and are clearly shown in Fig. 4. Accordingly, it will be apparent that the shaft 3' on which the jaw 3 is mounted is relatively stationary with respect to the other jaws of the upper set, and only moves when the entire upper expanding unit D is moved downwardly to clamp the slitted sheet and to return to place. Therefore, for the purpose of effecting the relative movements for expanding the metal sheet of the jaws 1, 2, 4 and 5, the shafts 1', 2', 4' and 5' respectively have a vertical movement in the slots 12 of the side frames B. The grouped shafts, with the exception of 3′, are given their movement by an actuating bell crank 13, to which they are connected by means of the relatively short suspending links 14, 15, 16 and 17. The said bell cranks 13 are pivotally mounted on the middle shafts 3′ and naturally have the same movement as the said shaft, as above pointed out. Therefore, it will be apparent that the individual jaws of the upper expanding unit D are actuated through the medium of bell crank units, which include the bell crank 13 mounted on the end of the shafts 3′. These units are duplicated, and in the present case each comprises three sets of similar bell cranks, transversely arranged grouped jaw supporting shafts and connecting links.

In order to actuate all of the bell crank units simultaneously to obtain a uniform movement of the individual jaws, all of the upper bell cranks 13 are joined by a connecting rod 18. With this construction and arrangement of operating devices for the individual jaws of the upper expanding unit D, it will be apparent by comparing Figs. 1 and 4, that the jaws 5 and 4 have an upward movement during the expanding operation, while the jaws 2 and 1 have a downward movement, and the intermediate jaw 3 remains relatively stationary. The movement of these individual jaws is a progressive one, i. e., the jaw 1 moves farther downward than the adjacent jaw 2, and 2 moves away from the relative fixed jaw 3, while the jaw 5 moves upward farther than its adjoining jaw 4, and 4 moves upward from the relative fixed jaw 3.

The lower expanding unit E, comprising the jaws 6 to 10 inclusive is similar in construction and mounting to the upper expanding unit. That is to say, the jaws 6 to 10 inclusive are mounted on transverse shafts 6′ to 10′ inclusive, and these shafts with the exception of 8′ ride in slots 12′ in the bottom frame members C, and are connected to the lower actuating bell cranks 19 by means of connecting links 20, 21, 22, and 23. The number of bell cranks for operating the lower expanding unit E are preferably the same as in the upper unit, and each bell crank member 19 is pivotally mounted on one of the shafts 8′ and joined with another by means of a connecting rod 24, thus insuring a uniform movement of each of the lower individual jaws. In connection with the jaws 9 and 10 of the lower set, it will be apparent that the same have an upward movement during the expanding operation, while the jaws 6 and 7 are so constructed and arranged that they have a downward movement during the operation of the machine, this movement being also progressive and complemental to the movement of the upper jaws. The intermediate jaw 8 in this lower set has no movement at all, the same being mounted on shafts 8′ which are journaled in the frame of the machine so as to form a fixed pivot for the bell cranks 19.

In view of the construction and arrangement of the individual jaws of the upper and lower expanding units, it will be noted that the jaws 1, 2, 6, and 7 have a downward movement during the expanding operation, while the jaws 4, 5, 9 and 10 have an upward movement, and the intermediate jaws 3 and 8 merely remain in the same position to clamp the middle of the slitted sheet during expanding.

It will of course be understood that the machine operates upon a previously slitted metal sheet which when expanded has the form and characteristics of the expanded metal product known as the "herringbone" lath. Accordingly, it will be apparent that the blank operated upon by the machine may be of the conventional form of slitted blank illustrated in Fig. 18 of the drawings, having a plurality of longitudinal rows of inclined parallel slits with intervening longitudinal uncut ribs or strips R between the rows of diagonal slits. A slitted sheet having this structural characteristic when placed in the machine is held stationary by the clamping jaws 3 and 8 along the line of the central longitudinal uncut rib R, while the opposite marginal side edges of the sheet are respectively engaged by the jaws 1 and 6, and 5 and 10, and alternate ones of the remaining uncut ribs by the jaws 2 and 7, and 4 and 9. It will thus be seen from Fig. 8 that one of the central ribs R is clamped stationary between the opposing corners of the jaws 3 and 8, and the successive complementary up and down movements of the related jaws 5 and 10, 4 and 9, 1 and 6, and 2 and 7, provide for swinging the strands between the slits in a direction to open the slits into meshes. This principle of expansion is substantially the same as disclosed and explained in the applicant's former Patents Nos. 651,643 and 668,669.

In order to bring about a uniform relative movement of the individual jaws of the upper and lower expanding units D and E, the end bell cranks associated with each unit are joined by means of vertically arranged coupling arms 25. In this connection, it will of course be obvious that since the hanger shafts pass transversely through the machine to support the individual jaws, the supporting connections for these shafts, and the actuating bell cranks, and all of their connections are duplicated on both sides of the machine, and therefore, the same reference numerals and the same description will apply to both.

While the bell cranks 19 for operating the lower expanding unit E are of the same general character and construction, the one nearest the rear end of the machine is provided with a bracket extension 26 which is pivotally connected as at 27 to a crank arm 28. This crank arm 28 is provided at its upper end with an elongated slot 29, within which operates a crank pin 30 carried by a crank disk 31. The said crank disk 31 is preferably mounted on one end of a shaft 32 arranged transversely at the read end of the machine, and also carrying another crank disk 33 on the opposite end thereof which is connected with one of the lower bell cranks 19 on the opposite side of the machine, by one of the crank arms 28.

The shaft 32 carrying disks 31 and 33 has arranged thereon a gear wheel 34 which meshes with a pinion 35 on a shaft 36. This shaft 36 has keyed thereto a clutch member 37 forming a part of a pin clutch device 38. This clutch device may be of various types, but is preferably of what is known as the pin-type, and essentially comprises a clutch member 37 made fast to the shaft 36 by the key $a$, and a driving gear 39 loose on said shaft and having a hub portion carrying the clutch projections $38^b$. This said clutch member 37 is provided with a peripheral groove $b$ in which the wedge shaped clutch head $38^a$ works to control the clutch-pin $c$. As will be observed from Figs. 19 and 20, more especially the latter, this pin is arranged in a longitudinally disposed guide hole $d$ in the clutch member 37, and is adapted to be forced beyond the face $e$ of the latter by means of a suitable spring $f$. For the purpose of holding the pin in the hole $d$ so that 37 and 39 are not in engagement, the same is provided with a slot $c'$ for engaging with the wedge face $g$ of the clutch head $38^a$. Accordingly, it will be apparent that when the clutch head $38^a$ is drawn downward it is disengaged from the clutch pin $c$, which is simultaneously thrown forward by the spring $f$ into the space X between 37 and 39 to engage the constantly rotating projections $38^b$ carried by the hub of gear 39, and thus connecting 37 and 39. After $38^a$ has been withdrawn to allow the engagement of pin $c$ and projections $38^b$, as above described, it is returned upward into groove $b$ of 37 so that when the latter makes one complete revolution, the nose of wedge $g$ of the head $38^a$ enters the slot $c'$ in the pin $c$ and withdraws the latter from engagement with the projections $38^b$ and into the hole $d$, thus returning it to the original and normal position. When this disengagement is accomplished as between 39 and 37, the latter remains idle until $38^a$ is again drawn downward by levers 45, $38^c$, and links $38^e$, whereupon the cycle of operation above described is repeated. With further reference to the clutch device and its operating instrumentalities, it will be observed from Fig. 20 that the clutch head $38^a$ above referred to is controlled by the T-lever $38^c$ pivoted as at $38^d$ to the framework of the machine. Also, in connection with the intermediate gear 39 having a hub-portion carrying the projections $38^b$, it will be observed that the same meshes with a driving pinion 40 on a driving shaft 41 which receives its power from an electric motor M through a motor pinion 42 and a large driving gear 43. It will thus be apparent that the electric motor M may continuously drive the shaft 41 and gear 39 by the means described, and when it is desired to bring the expanding units into operation, it is only necessary to operate the clutch device 38 to connect the normally idle shaft 36 with the gear 39 which is always in motion and turning freely on the shaft 36. This clutch device 38 is provided with both manual and automatic controlling means. The manual controlling means consists of a hand lever 44 arranged at the front end of the machine and pivotally connected to a spring tensioned actuating arm 45. When the clutch device 38 is in its inoperative position, and it is desired to start the machine, it is only necessary to move the hand or operator's lever 44 so that the clutch device 38 is caused to couple the shaft 36 with gear 39 through the member 37 and pin $c$. That is to say, when the operator's lever 44 is pulled forward, the clutch head $38^a$ is pulled downward to let the pin $c$ snap into engagement with the projections $38^b$. Consequently, as the shaft 36 turns the shaft 32 which carries the crank disks 31 and 33, any movement of this shaft 36 will begin to rotate these crank disks. From this construction thus far described, it would appear that the operator must continuously hold the handle 44 in such a position that the clutch device 38 will keep the shaft 36 and gear 39 coupled, since the clutch device is normally inoperative. However, in order to eliminate any manual control of this operation of the machine other than the initial starting thereof, the clutch device 38 is constructed to include a link 46 pivotally connected at one end with the T-lever $38^c$ and having its other end connected with an automatic control lever 47 also pivoted in the framework of the machine, as at 48. Said lever carries at one end a roller 49 which operates against the periphery 50 of the crank disk 31, which is in the nature of a controlling cam, since it is provided with a cut-out portion or depression 51 in which the roller 49 rests when the expanding mechanism is not in operation. It will thus be obvious that the sole function of the hand lever 44 is to initially couple the shaft 36 and gear 39 so that the crank disk 31 is turned sufficiently to get the roller 49 out of the depression 51 in the periphery of the disk, and make the same travel over the unbroken peripheral surface 50 thereof, thus permitting the clutch device 38 to remain active and couple the shaft 36 and gear 39 long enough for the crank disks 31 and 33 to make one complete revolution. It will also be apparent that as soon as the roller 49 falls into the depression 51 after the disk has made one complete revolution, that the clutch is automatically disengaged, and the machine comes to a state of rest, ready for the next expanding operation, even though the shaft 41 and gear 39 may be continuously rotating.

The crank disk 33, in addition to performing the same function as the disk 31, as far as actuating the jaws of the upper and lower expanding units is concerned, also has another function, namely that of causing the operation of the pneumatic control devices which operate means to bodily manipulate the upper expanding unit D. That is to say, the periphery 52 of the disk 33 carries cam projections 53 and 54 respectively which are adapted to actuate the stem 55 of a two-way starting valve device 56. In connection with this feature of the device which provides for raising and lowering the upper expanding unit D onto the lower expanding unit E, by pneumatically controlled instrumentalities, it may be here noted that the upper expanding unit is lowered onto the unit beneath for the purpose of first firmly clamping the slitted metal sheet prior to the individual jaws of each unit coming into play to effect the expanding operation. This lowering of the upper expanding unit D in its entirety therefore, takes place before any expansion, and is accomplished by means of the crank disks 31 and 33 having a slight initial rotary movement sufficient to cause the cam 53 to actuate the valve stem 55, and without lifting the arm 28 which connects with the bell cranks for operating the jaws. This initial movement of the disks 31, 33 is made possible by the crank pins 30 carried by these disks riding in the slots 29 in the arms 28. In other words, the slot 29 in the end of the lever 28 is sufficient to permit the crank pin 30 to ride idly therein for such a length of time as is necessary for the crank disks to turn to bring the came 53 into play. Assuming then that the operation of the machine has been started by manually causing the clutch device 38 to come into play, it will of course be apparent that through the instrumentalities just described, the crank disks will rotate a sufficient distance to actuate the valve stem 55 of the starting valve 56. This starting valve 56 is in the nature of a two-way valve which is controlled by a sliding valve head 57 on the valve stem 55, as clearly shown in Figs. 12 and 13 of the drawings. Referring to the valve, it will be observed that the same includes a casing having a centrally arranged air chamber 58 which communicates by means of a pipe 59 with a live air storage tank 60. Upon the lifting of the valve stem 55, the construction of the valve is such that live air is permitted to escape through the pipe 61 to the piston chamber 62 of an automatic clutch control device 63, and also to the top of a closing valve device 64 through the pipe 65. This closing or cut-off valve device 64 is preferably of the same construction as the starting valve 56, and the effect of live air being admitted to the top thereof from the valve 56 and piston chamber 62, is to push the valve stem 66 into such a position that live air cannot be supplied thereto from the source 60 through the pipe 67. When the parts of the valve device 64 are in this position, air is permitted to exhaust from the chamber 68 of the device 63 through pipe 69, and through the valve 64 to the atmosphere through the exhaust pipe 70 associated therewith. This operation which admits live air through the pipe 61 to the chamber 62 of the automatic clutch control device 63 pushes the piston 62$^a$ thereof in the direction of the arrow indicated in Fig. 10. When the piston 62$^a$ is thus operated, the clutch yoke lever 71 which is pivoted to the framework of the machine as at 72 will be operated or turned in such a direction that it will set in motion the means for bodily moving the upper expanding unit D. The reverse of this operation, that is, when the chamber 68 is filled with live air by the stopping valve 64 to operate piston 68$^a$ and apply the brake, is shown diagrammatically in Fig. 11. This figure also represents the normal, at rest position, of the apparatus.

In the diagrammatic illustration of the valves and piping arranged between the same and the device 63 shown in Fig. 11, the valves 56 and 64 are shown in their normal position in full lines, i. e., in the positions which they assume when the machine is at rest. The dotted lines indicate the positions that the valve parts temporarily assume during the operation of the machine, thus the air circuits may be readily followed in connection with the foregoing.

With reference to the construction of the means for lowering the upper expanding unit D in its entirety, it will be observed that the same essentially comprises a multiple disk clutch and brake unit or device, designated in its entirety by the reference numeral 73, and a worm shaft 74 journaled as at 75 in the framework of the machine and having thereon worm pinions 76 meshing with worm gears 77 in which are eccentrically mounted or carried the ends of the shafts 3′ of the intermediate jaw member 3 of the upper expanding unit D. Since the shaft 3′ of each bell crank set is eccentrically mounted in bearings 3$^a$ which rotate about their own true center in the side frames 13$^c$ B—B, the worm gears 77 which eccentrically receive the ends of each shaft 3' will of course also rotate about their own true centers. This work operating shaft 74 mounted in the upper part of the framework of the machine carries at one end a pinion 78 which meshes with a pinion or gear 79 carried by a driving shaft 80. The said driving shaft 80 has its rear end journaled as at 81 in the framework of the machine, and has loosely arranged thereon a driving wheel 82 receiving its power from a motor M' and motor driven pinion 83, and is adapted to be connected and disconnected with the shaft 80 by means of the multiple disk clutch and brake device or unit 73. This device 73 includes in its organization a clutch drum 84 which is carried by the sleeve 85 on which the wheel 82 is mounted, and adapted to rotate therewith, and is also provided with a stationary clutch head 86. The device further includes a stationary brake drum 87 securely mounted on the framework of the machine, and having at one end a stationary braking head 88. Slidably mounted on the squared portion 89 of the shaft 80 is a control member consisting of a sleeve 90 carrying at one end a grooved collar member 91 slidably embracing the shaft 80 and adapted to receive the forked end of the clutch yoke lever 71. This control sleeve 90 is further provided at its inner end with a movable clutch head 92 operating within the clutch drum 84 in opposition to the relatively fixed clutch head 86, and is also provided with a braking head 93 operating within the brake drum 87 and working in opposition to the stationary braking head 88. Between the movable clutch head 92 and fixed clutch head 86 within the clutch drum 84, are a plurality of friction clutch disks 94, certain of which loosely interlock with the sleeve or control member 90. A similar arrangement of friction brake disks 95 may also be found within the brake drum 87 between the stationary braking head 88 and the movable braking head 93, and they coöperate with the control sleeve 90 in a similar manner. Accordingly, it will be apparent that when the sleeve 90 is shifted to the right, (live air being in 62), as shown in Fig. 10, the disks 94 within the clutch drum 84 will be placed under compression between the movable clutch head 92 and fixed clutch head 86, while the disks 95 within the brake drum will be released from compression. The shaft 80 will therefore be locked with the wheel 82, so as to rotate therewith, and transmit motion to the worm shaft 74 through the pinions 79 and 78.

From the foregoing, it will be apparent that when live air is contained in the chamber 62, the clutch yoke lever 71 is shifted so as to move the clutch sleeve 90 to the right, or in the direction of the arrow, Fig. 10, to start the apparatus. That is to say, the worm shaft 74 will be rotated so that the gears 77 are turned counter-clock-wise in Fig. 1 to bring the shafts 3' to their lowest position. As these shafts 3' not only carry the intermediate jaw 3 of the upper expanding unit D, but also carry the upper bell cranks 13 which support all of the other jaws, it will be apparent that the entire upper expanding unit D will be lowered. As soon as the work shaft 74 has rotated the gears 77, so that the shafts 3' are in their lowest position, a lug 96 on the middle gear 77 strikes the valve stem 66 of the cut-off or stopping valve 64 to throw the multiple clutch device 73 into braking position, thus stopping the rotation of the worm shaft. The expanding operation then begins to take place through the rotation of the crank disks 31 and 33.

In connection with the middle gear wheel 77, having the lug 96 thereon, it will also be noted, more plainly from Fig. 14 that the same is provided with another lug 97 which performs the same function as the lug 96, though at a different time. This middle gear wheel 77 is provided with an annular groove 77ᵃ in which the lugs 96 and 97 are clamped. The purpose of so constructing the gear wheel 77 is to provide for the relative adjustment or setting of each of these lugs to properly time their operation in connection with the rest of the apparatus. That is to say, these lugs are relatively adjustable on the face of the middle gear 77 so that the clamping and unclamping of the slitted metal sheet may be closely adjusted. Normally the lug 96 is approximately 90° from the abutment 66ᵃ on the valve operating tappet arm 66ᵇ which is pivotally mounted as at 66ᶜ to part of the framework of the machine. When the lug 96 occupies the position stated, the lug 97 is on the other side of the abutment 66ᵃ, so that it must travel in practically a complete circle before it can again lift the tappet arm 66ᵇ by striking the abutment thereon.

The lug 96 provides means for operating the valve 66 after the worm shaft 74 has made about three revolutions, or a sufficient number of revolutions to bring the shaft 3' through an angle of about 90° from its normal position as shown in Fig. 1 to its lowest position, thus bodily lowering the upper expanding unit onto the lower expanding unit. In other words, the lug 96 operates the valve 64 to stop the mechanism that is rotating the worm shaft 74 after the upper expanding unit has been lowered into clamping position.

After the upper expanding unit has been lowered, the lugs 96 and 97 occupy such a position that the lug 96 is in practically the same location that the lug 97 was normally. While in this position, the expanding units D and E operate to progressively expand the metal sheet, and after the sheet has been expanded, and the cam 54 on the disk 33 has again set in operation the pneumatic apparatus to turn the worm shaft 74, the middle gear wheel 77 will be rotated so that the lug 97 will be rotated toward the abutment 66ª on the valve operating tappet arm. When the lug 97 lifts the tappet arm 66ª at this time, the valve 64 is operated to again shut down the pneumatic apparatus, since the parts of the machine have been returned to normal position. It will thus be apparent that the lugs 96 and 97 each come into operation, at timed intervals, during each cycle or operation of the machine, the lug 96 being the first to come into play, and the lug 97 following at the proper time.

With reference to the stopping of the worm shaft 74 by means of the lug 96 on the center gear wheel 77, operating the valve stem 66 of the cut off valve 64, it may be noted that as the said valve stem 66 is raised, live air is admitted from the source 60 through the pipe 67 to the valve 64, thence through the pipe 69 to the chamber 68 of the automatic clutch control device 63 and top of the valve 56 through pipe 69ª. The air that has been caged within the chamber 62 by this operation makes its escape through pipe 61, valve 56 and exhaust pipe 56ª associated therewith.

The effect of the admission of live air to the chamber 68 by the valve 64 is to shift the clutch yoke lever 71 in such a direction that the sleeve 90 will release the friction disks 94 compressed between 92 and 86 of the clutch, and compress the friction disks 96 between the members 93 and 88 of the brake element, thus entirely stopping the rotation of the shaft 80 without shock or jar and permitting the clutch drum 84 to spin idly on the shaft 80 together with the wheel 82.

With reference to the manner of operation of the machine, it will be apparent, more especially from Fig. 15, that when the hand lever 44 is moved, the spring tensioned rod 45 connecting with the clutch device 38, will operate the said clutch so that power from the motor pinion 42 will be transmitted through the various gear wheels to the crank shaft 32, thus rotating the same and the crank disks 31 and 33. This operation of the hand lever 44 always lifts the roller 49 out of the cam depression 51 in the disk 31, at the same time permitting the clutch device 38 to become engaged so that the crank disks 31 will commence to rotate, bringing its periphery 50 onto the roller 49, and thereby serving to automatically and continuously hold the clutch device 38 engaged or in operative position for a complete cycle of the machine. The initial movement of the crank disks 31 and 33 is idle so far as the operation of the individual members of the expanding units is concerned. That is to say, the crank pin 30 on the crank disk 31 has an idle movement in the slot 29 of the arm 38 which will permit the shaft 32 to turn the crank disk 33 a sufficient distance to cause the cam 53 to lift the valve stem 55 and thus operate the starting valve 56. The actuation of the valve 56 throws into operation the pneumatic apparatus at the top of the machine, designated generally as P, which rotates the worm shaft 74 through the gears 78 and 79. The rotation of the worm shaft turns all of the gear wheels 77 so that all of the shafts 3' are brought from their normal or first positions as shown in full lines in Fig. 15 through the arc of a circle to their lowermost positions, shown by dotted lines in the same figure. This bodily lowers the upper set of bell cranks 13 in unison, bringing the upper expanding unit D down onto the lower expanding unit E, as shown by the dotted lines in Fig. 15. When the upper expanding unit is completely lowered onto the lower expanding unit, the lug 96 on the middle gear wheel 77 lifts the stem 66 of the closing valve 64, thus operating the same to shut off the pneumatic apparatus P. Up to this time, it will be apparent that no expansion has taken place, since the arm 28 has not been moved or lifted up so as to rock the bell crank sets. In other words, all of this operation has taken place while the crank pin 30 has been riding in the slot 29 of the arm 28, as per Figs. 15 and 16. Now, as the upper and lower expanding units have clamped therebetween a slitted metal sheet, the continued rotation of the crank disks 31 and 33 raises the arms 28 connected with the lower set of bell cranks 19 as at 27, thus rocking all of the connected bell cranks 19 of the lower set, and all of the connected bell cranks 13 of the upper set to the dotted line positions shown in Fig. 16. The entire progressive expansion of the slitted metal sheet takes place while the arms 28 are being carried by the pins 30 from their normal position of Fig. 15 to a diametrically opposite position on the faces of the disks 31 and 33, as per dotted lines in Fig. 16. Thus, it will be apparent that as the crank pin 30 is traveling through an arc of about 180°, all of the bell cranks will rock sufficiently to completely expand the metal sheet. As soon as the crank pins 30 of the disks 31 and 33 reach the zenith of their upward movement during the rotation of the said disks, and begin to descend, a second cam 54 on the disk 33 again actuates the valve device 56, as per positions shown in Fig. 17, to again throw into operation the pneumatic apparatus P. The effect of this pneumatic appartaus being thrown into operation at this time, is to again rotate the worm shaft 74, thus turning the gear wheels 77 so as to bring the shafts 3' from their lowermost positions which they have occupied during the expansion of the metal sheet, back to their normal positions through the balance of the circle not previously described in going from their normal position to their lowermost position. When the shafts 3' have been lifted, thus lifting the entire upper expanding unit D, a second lug 97 on the middle gear wheel 77 again lifts the stem 66 of the valve 64 to shut down the pneumatic apparatus as before described. At the same time the foregoing action has been taking place, that is the bodily lifting of the upper expanding unit D, the crank disks 31 and 33 have been rotating so as to complete their cycle and return the crank arms 28 to a normal position, shown in dotted lines in Fig. 17, thus rocking all of the sets of bell cranks 13 and 19 in a reverse direction to which they were rocked when the crank pin 30 was ascending, and returning all of the individual jaw members of the upper and lower expanding units D and E to their normal position. As the several operative parts are simultaneously returned to their normal position, the crank disk 31 also comes into such a position that the cam depression 51 in the periphery thereof again receives the roller 49 of the automatic clutch arm 48. Accordingly, it will be understood that as the roller 49 drops into its cam depression, the clutch device 38 is automatically disengaged or rendered inoperative. That is to say, the clutch 38 disengages the shaft 36 and gear 39, and leaves the entire machine in a state of rest, and ready for the next operation, through the manipulation of the hand lever 44.

From the foregoing, it is though that the construction, operation, and many advantages of the hereindescribed improvements in machine controlling apparatus will be apparent without further description, and it will be understood that changes in the form, proportion, and minor details of construction may be resorted to without departing from the spirit of the invention or scope of the appended claims.

I claim:

1. A machine controlling mechanism including, in combination with the moving part of the machine to be operated, a combined clutch and brake unit having an operative connection with said moving part, and a fluid pressure operating means for said unit.

2. A machine controlling mechanism including, in combination with the moving part of the machine to be operated, a combined clutch and brake unit having an operative connection with said moving part, and a fluid-pressure device having an operative connection with both the clutch and brake of said unit to simultaneously operate the same.

3. A machine controlling mechanism including, in combination with the moving part of the machine to be operated, a combined clutch and brake unit operatively connected with said moving part, an operating means common to the clutch and the brake of said unit to respectively apply and release the same simultaneously, and a fluid-pressure device connecting with said operating means.

4. A machine controlling mechanism including, in combination with the moving part of the machine to be operated, a multiple-disk clutch and a multiple-disk brake operatively connected with said moving part, a common operating means for both the clutch and brake, and a fluid-pressure device having a shifting connection with the said operating means.

5. A machine controlling mechanism including, in combination with the moving part of the machine to be operated, a multiple-disk clutch and a multiple-disk brake operatively connected with said moving part, a common operating means for the clutch and brake including a sleeve member connecting with the movable disks of the clutch and of the brake, and a fluid-pressure device having a shifting connection with said sleeve.

6. A machine controlling mechanism including, in combination with the moving part of the machine to be operated, a combined clutch and brake unit having an operative connection with said moving part, and a fluid-pressure cylinder and piston device operatively connected with said operative connection.

7. A machine controlling mechanism including, in combination with the moving part of the machine to be operated, a combined clutch and brake unit having an operative connection with said moving part, and a fluid-pressure cylinder and piston device including a shift lever connected with said operative connection.

8. A machine controlling mechanism including, in combination with the moving part of the machine to be operated, a combined clutch and brake unit having an operative connection with said moving part, and a fluid-pressure device operatively connected with both the clutch and brake of said unit, and including automatically actuated starting and stopping means.

9. A machine controlling mechanism including, in combination with the moving part of the machine to be operated, a combined clutch and brake unit operatively connected with said part, a fluid-pressure device controlling the said unit and including automatically operated starting and stopping valves respectively.

10. A machine controlling mechanism including, in combination with the moving part of the machine to be operated, a driving unit operatively connected with said moving part, and a fluid-pressure device having means for starting and stopping said driving unit and including automatically actuated starting and stopping means.

11. A machine controlling mechanism including, in combination with the moving part of the machine to be operated, a driving unit operatively connected with said moving part, and a fluid-pressure device having means for starting and stopping said driving unit and including automatically actuated starting and stopping valves.

12. A machine controlling mechanism including, in combination with the moving part of the machine to be operated, a combined clutch and brake unit operatively connected with said moving part, operating means common to the clutch and the brake of said unit to respectively apply and release the same simultaneously, and a fluid-pressure cylinder and piston device having a shift lever connection with said operating means.

13. A machine controlling mechanism including, in combination with the moving part of the machine, a multiple-disk clutch and multiple-disk brake operatively connected with said moving part, a common operating element for said clutch and brake including a sleeve member connecting with the movable disks of the clutch and of the brake, and a fluid-pressure cylinder and piston device having a shift lever connection with said operating means common to the clutch and brake.

14. A machine controlling mechanism including, in combination with the moving part of the machine to be operated, a combined clutch and brake unit operatively connected with said moving part, an operating element common to the clutch and brake of said unit to respectively apply and release the same simultaneously, a fluid-pressure device having a shift connection with said element common to the clutch and brake of said unit, and means for automatically controlling said pressure device.

15. A machine controlling mechanism including, in combination with the moving part of the machine to be operated, a multiple-disk clutch and a multiple-disk brake operatively connected with said moving part, common operating means for said clutch and brake including a sleeve member connecting with the movable disks of the clutch and of the brake, a fluid-pressure cylinder and piston device, a shift lever element operatively connected with said sleeve and adapted to be actuated by said cylinder and piston device, and valve means for automatically controlling said fluid pressure device.

16. A machine controlling mechanism including, in combination with the moving part of the machine to be operated, a driving unit operatively connected with said moving part, a fluid-pressure device having means for operating said unit and also having starting and stopping valves respectively, and separate moving elements on the machine for respectively controlling said starting and stopping valves.

17. A machine controlling mechanism including, in combination with the moving part of the machine to be operated, a driving unit operatively connected with said moving part, a fluid-pressure device having means for operating said unit and also having starting and stopping valves respectively, and separate moving elements on the machine for respectively automatically controlling said starting and stopping valves.

18. A machine controlling mechanism including, in combination with the moving part of the machine to be operated, a driving unit for operating said moving part, and a fluid-pressure device having means for operating said unit and also having starting and stopping valves respectively, and separate alternately operating elements on the machine for automatically controlling said starting and stopping valves respectively.

19. A machine controlling mechanism including, in combination with the moving part of the machine to be operated, a driving unit for operating said moving part, and a fluid-pressure device having means for operating said unit and also having starting and stopping valves respectively, and separate successively operating elements on the machine for automatically controlling said starting and stopping valves respectively.

20. A machine controlling mechanism including, in combination with the moving part of the machine to be operated, a driving unit for operating said moving part, and a fluid-pressure device having means for operating said unit and also having starting and stopping valves respectively, and separate successively and alternately operating elements on the machine for automatically controlling said starting and stopping valves respectively.

21. A machine controlling mechanism including, in combination with the moving part of the machine to be operated, a combined clutch and brake unit having an operative connection with said moving part, fluid-pressure actuated means for said unit including automatically operated starting and stopping valves, means carried by a moving part of the machine to be operated for operating said stopping valve, and other means for operating said starting valve.

22. A machine controlling mechanism including, in combination with the moving part of the machine to be operated, a combined clutch and brake unit having an operative connection with said moving part, fluid-pressure actuated means for said unit including automatically operated starting and stopping valves, means carried by a moving part of the machine for operating said stopping valve, and other means on the machine for operating said starting valve including a rotary cam disk.

23. A machine controlling mechanism including, in combination with the moving part of the machine to be operated, a combined clutch and brake unit having an operative connection with said moving part, fluid-pressure actuated means for said unit including automatically operated starting and stopping valves, spaced valve actuating elements carried by a moving part of the machine for operating said stopping valve, and other means on the machine including a disk having spaced cams for operating said starting valve.

24. A machine of the class described, including a rising and falling unit comprising a plurality of operating members, a raising and lowering mechanism for said unit having cam devices, an operating mechanism for said operating members including cam devices, and a driving unit operatively connected with the raising and lowering mechanism and having starting and stopping devices respectively engaged by the cam devices of said operating mechanism and of said raising and lowering mechanism.

25. A machine of the class described, including a rising and falling unit comprising a plurality of operating members, a raising and lowering mechanism for said unit having cam devices, a separate operating mechanism for the individual operating members having a limited idle movement and cam devices, and a driving unit operatively connected with the raising and lowering mechanism and having starting and stopping devices respectively engaged by the cam devices of said operating mechanism and of said raising and lowering mechanism.

26. A machine of the class described, including a rising and falling unit comprising a plurality of operating members, a raising and lowering mechanism for said unit, a separate operating mechanism for the individual operating members having a limited idle movement, and a driving unit operatively connected with the raising and lowering mechanism and including starting and stopping devices automatically engaged respectively by moving parts of said operating mechanism and of said raising and lowering mechanism.

27. A machine of the class described, including a rising and falling unit having a plurality of operating members, a raising and lowering mechanism operatively connected with said unit, a separate operating mechanism operatively connected with the operating members and having a limited idle movement, and a pneumatically controlled driving unit having starting and stopping valves respectively actuated by moving parts of said operating mechanism and of said raising and lowering mechanism.

28. A machine of the class described, including a rising and falling unit comprising a plurality of operating members, a raising and lowering mechanism operatively connected with said unit as an entirety, a separate operating mechanism individually connected with the separate operating members and having a limited idle movement, a pneumatically controlled driving unit operatively connected with the raising and lowering mechanism, means for automatically causing an initial movement of the raising and lowering mechanism upon the idle play of said operating mechanism, means for causing the driving unit and the raising and lowering mechanism to be thrown out of action during the active play of said operating mechanism, and means for automatically arresting the play of said operating mechanism and restarting the operation of the raising and lowering mechanism.

29. A machine of the class described, including a rising and falling unit having a plurality of separate jaw members, a raising and lowering mechanism including eccentric devices suspending said unit, a separate operating mechanism for the individual jaw members including elements also suspended by said eccentric devices, and a driving unit operatively connected with said eccentric devices and having starting and stopping means respectively actuated by said operating mechanism and by the raising and lowering mechanism.

30. A machine of the class described, including a rising and falling unit comprising a plurality of jaw members, a raising and lowering mechanism consisting of a series of eccentrically mounted hanger shafts suspending the said unit as a whole, and worm gears carrying said shafts, a separate operating mechanism for the individual jaw members including elements also carried by said hanger shafts, and a driving unit including a worm shaft geared with said worm wheels and also including starting and stopping devices separately actuated from said operating mechanism and from one of the worm wheels.

31. A machine of the class described, including a rising and falling unit comprising a plurality of jaw members, a raising and lowering mechanism consisting of a series of eccentrically mounted hanger shafts suspending the said unit as a whole, and worm gears carrying said shafts, a separate operating mechanism for the individual jaw members including elements also carried by said hanger shafts, and a pneumatically controlled driving unit including a worm shaft geared with said worm wheels and also including starting and stopping devices separately actuated from said operating mechanism and from one of the worm wheels.

32. A machine of the class described, including a rising and falling unit comprising a plurality of jaw members, a raising and lowering mechanism consisting of a series of eccentrically mounted hanger shafts suspending the said unit as a whole, and worm gears carrying said shafts, a separate operating mechanism for the individual jaw members including elements also carried by said hanger shafts, and a pneumatically controlled driving unit having starting and stopping valves separately actuated from said operating mechanism and from one of the worm wheels.

33. A machine of the class described, including a rising and falling unit comprising a plurality of jaw members, a raising and lowering mechanism comprising a plurality of eccentrically mounted hanger shafts carrying the said unit as a whole, and worm gears for carrying said shafts in a circular path, a separate operating mechanism having elements also carried by said hanger shafts, and including a crank disk provided with spaced cam elements, spaced cam elements on one of the worm gears, and a pneumatically controlled driving unit having separate starting and stopping valves respectively engaged by the cam elements on the crank disk and the cam elements on said worm gear.

34. A machine of the class described, including a rising and falling unit comprising a plurality of jaw members, a raising and lowering mechanism comprising a plurality of eccentrically mounted hanger shafts carrying the said unit as a whole, and worm gears for carrying said shafts in a circular path, a separate operating mechanism having elements also carried by said hanger shafts, and including a crank disk provided with spaced cam elements, spaced cam elements on one of the worm gears, and a pneumatically controlled clutch and brake driving unit having separate starting and stopping valves respectively engaged by the cam elements on the crank disk and the cam elements on said worm gear.

35. A machine of the class described, including a rising and falling unit, comprising a plurality of jaw members, a raising and lowering mechanism comprising a plurality of eccentrically mounted hanger shafts carrying the said unit as a whole, and worm gears for carrying said shafts in a circular path, a separate operating mechanism including a crank disk provided with spaced successively acting cam elements, spaced successively acting cam elements on one of the worm gears, and a penumatically controlled driving unit having separate starting and stopping valves respectively engaged by the cam elements on the crank disk and the cam elements on said worm gear.

36. A machine of the class described, including a rising and falling unit, comprising a plurality of jaw members, a raising and lowering mechanism comprising a plurality of eccentrically mounted hanger shafts carrying the said unit as a whole, and worm gears for carrying said shafts in a circular path, a separate operating mechanism including a crank disk provided with spaced successively acting cam elements, spaced successively acting cam elements on one of the worm gears, and a pneumatically controlled driving unit having separate starting and stopping valves alternately actuated by the spaced successively acting cam elements on the crank disk and one of said worm gears.

37. A machine of the class described, including a rising and falling unit, comprising a plurality of jaw members, a raising and lowering mechanism comprising a plurality of eccentrically mounted hanger shafts carrying said unit as a whole, worm gears for carrying said shafts in a circular path, a worm shaft meshing with said gears, a pneumatically controlled driving unit operatively connected with said worm shaft, separate starting and stopping valves associated with said driving unit, spaced cam elements on one of said worm gears for actuating said stopping valve, and a separate operating mechanism including a crank disk also having spaced cam elements for operating said starting valve.

38. A machine of the class described, including a rising and falling unit comprising a plurality of jaw members, a raising and lowering mechanism comprising a plurality of eccentrically mounted hanger shafts carrying the said unit as a whole, worm gears for carrying said shafts in a circular path, a worm shaft meshing with said worm gears, a pneumatically controlled clutch and brake driving unit operatively connected with said worm shaft, separate starting and stopping valves associated with said driving unit, spaced cam elements on one of said gears for actuating said stopping valve, and a separate operating mechanism including a crank disk also having spaced cam elements for operating said starting valve, said spaced cam elements on the worm gear and crank disk adapted to alternately operate said starting and stopping valves.

39. A machine of the class described, including a fixed unit, a rising and falling unit, a raising and lowering mechanism for said latter unit comprising a plurality of eccentrically mounted hanger shafts carrying said units as a whole, worm gears for carrying said shafts in a circular path, a pneumatically controlled driving unit for operating said rising and falling unit, separate starting and stopping valves associated with said driving unit, spaced cam elements on one of said gears for actuating said stopping valve, a separate operating mechanism including crank disks having operative connections with both said fixed and rising and falling units, and spaced cam elements on one of said disks for actuating said starting valve.

40. A machine of the class described including a fixed unit comprising a plurality of jaw members, a rising and falling unit also comprising a plurality of jaw members, a raising and lowering mechanism for said latter unit comprising a plurality of eccentrically mounted hanger shafts carrying said unit as a whole, worm gears for carrying said shafts in a circular path, a pneumatically controlled driving unit for operating said rising and falling unit, separate starting and stopping valves associated with said driving unit, spaced cam elements on one of said gears for actuating said stopping valve, and a separate operating mechanism including a driving element, crank disks actuated by said driving element, one of said disks having spaced cam elements for actuating said starting valve, and operating connections between said disks and said fixed and rising and falling units.

In testimony whereof I hereunto affix my signature in the presence of two witnesses.

HERBERT E. WHITE.

Witnesses:
A. J. WATSON,
O. D. KAISER.